Figure 1:
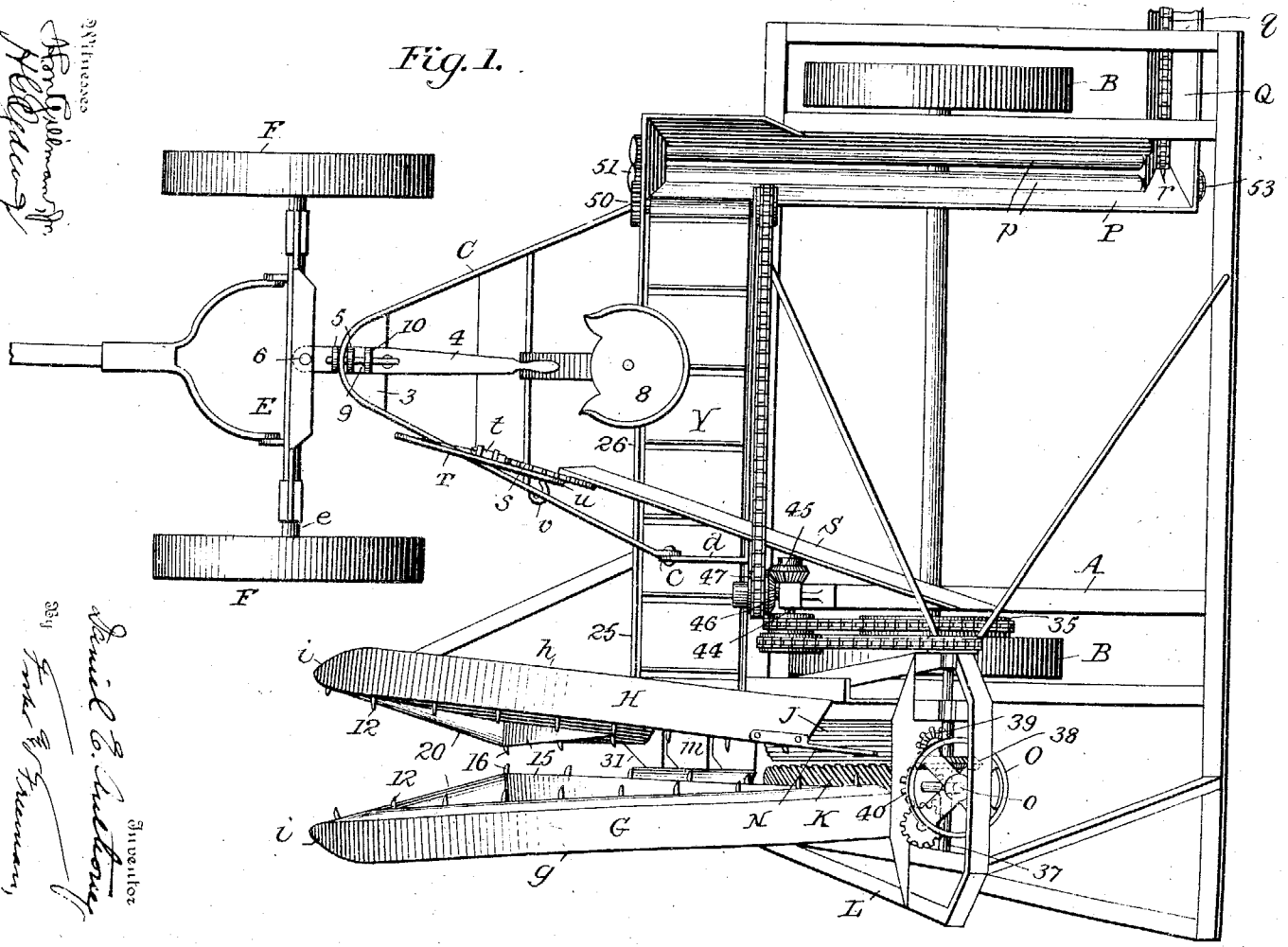

No. 12,044.

Reissued Oct. 14, 1902.

D. E. ANTHONY.

CORN HARVESTER.

(Application filed Dec. 20, 1901.)

3 Sheets—Sheet 1.

Witnesses

H. Montgomery Jr.

H. C. Edwards

Inventor

Daniel E. Anthony

By Foster & Freeman,

Attorneys

No. 12,044.
Reissued Oct. 14, 1902.
D. E. ANTHONY.
CORN HARVESTER.
(Application filed Dec. 20, 1901.)
3 Sheets—Sheet 2.
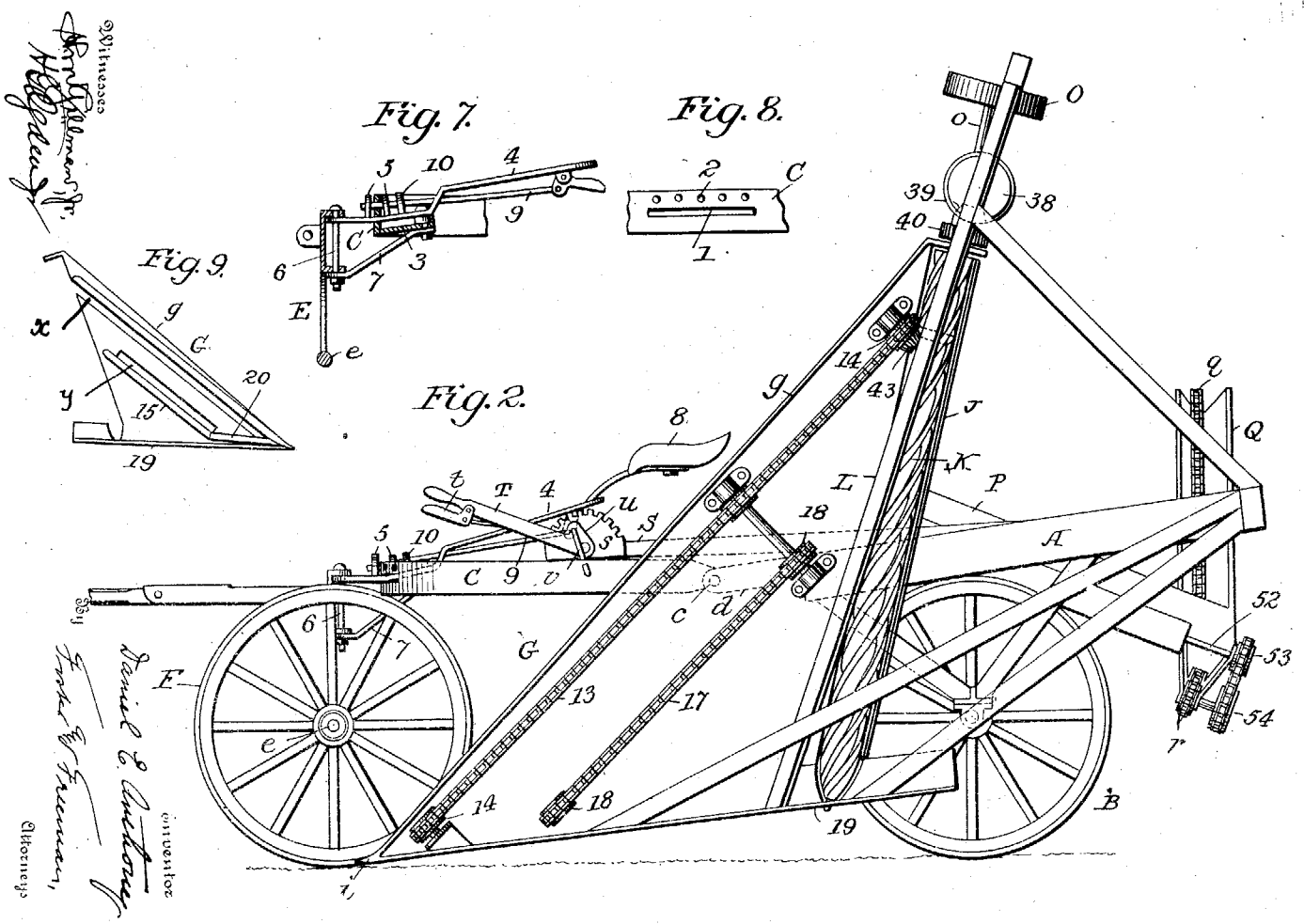
Witnesses
Arnt Gillman, Jr.
H. C. Ogden Jr.
Inventor
Daniel E. Anthony
By Foster & Freeman,
Attorneys No. 12,044. Reissued Oct. 14, 1902.
D. E. ANTHONY.
CORN HARVESTER.
(Application filed Dec. 20, 1901.)
3 Sheets—Sheet 3.
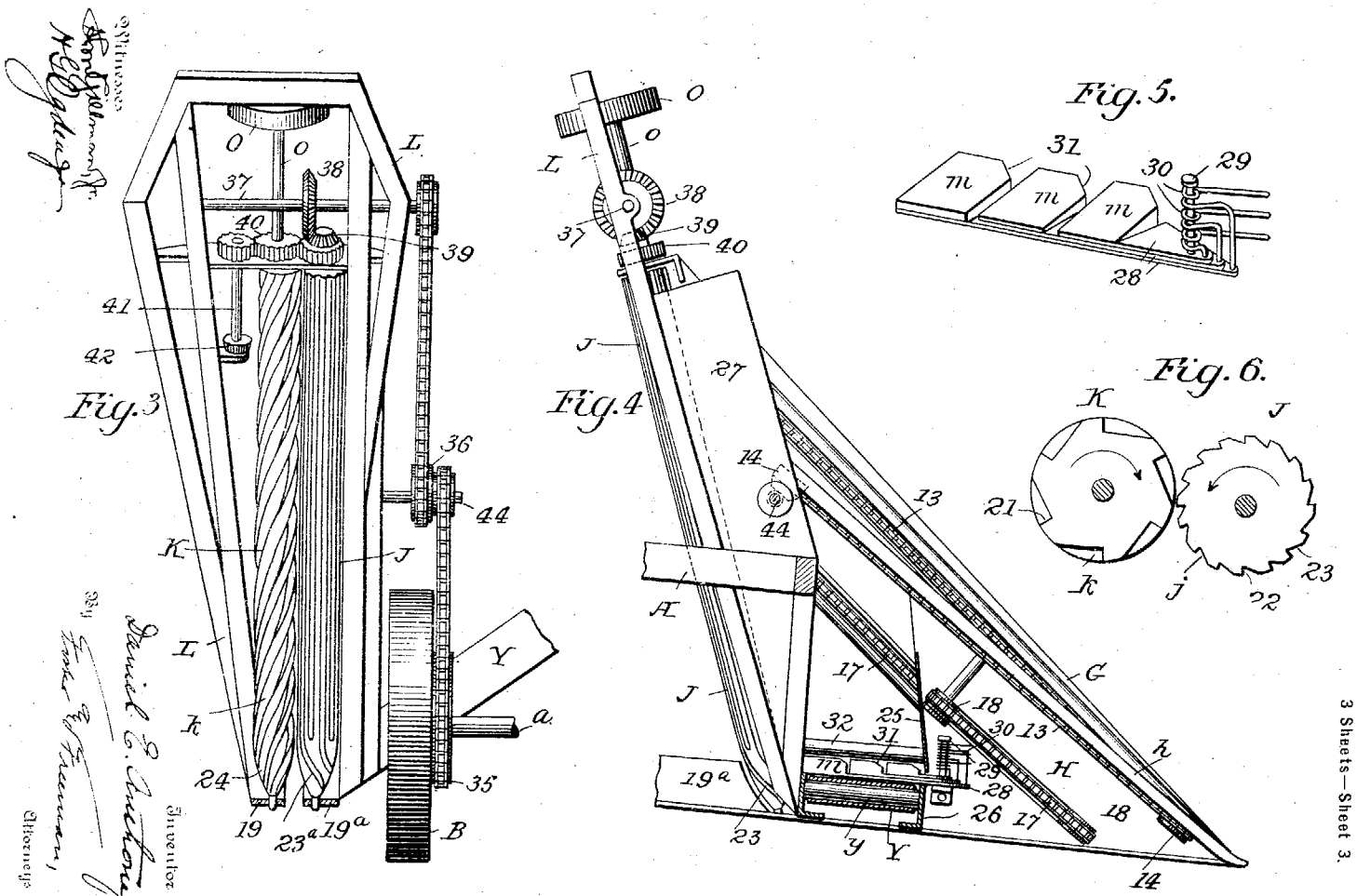
Witnesses
Henry Gillman, Jr.
H. G. Ogden
Inventor
Daniel E. Anthony
By Foster & Freeman,
Attorneys

UNITED STATES PATENT OFFICE.

DANIEL ELMER ANTHONY, OF AKRON, IOWA, ASSIGNOR OF ONE-HALF TO EMERY E. MELLEN, OF AKRON, IOWA.

CORN-HARVESTER.

SPECIFICATION forming part of Reissued Letters Patent No. 12,044, dated October 14, 1902.

Original No. 665,301, dated January 1, 1901. Application for reissue filed December 20, 1901. Serial No. 86,719.

*To all whom it may concern:*

Be it known that I, DANIEL ELMER ANTHONY, a citizen of the United States, residing at Akron, in the county of Plymouth and State of Iowa, have invented certain new and useful Improvements in Corn-Harvesters, of which the following is a specification.

This invention relates to a corn-harvester designed to remove the ear from the stalk without breaking the stalk or pulling it from the ground and subsequently to husk the detached ears and deliver them into a suitable receptacle.

The invention will be fully described hereinafter, reference being had to the accompanying drawings, in which—

Figure 1 is a plan view of a corn-harvesting machine constructed in accordance with my invention. Fig. 2 is a side elevation. Fig. 3 is a rear view of the snapping-rollers and the driving mechanism. Fig. 4 is a side view of the gathering mechanism looking from the opposite side of Fig. 2. Fig. 5 is a perspective view of the sectional gate at the foot of the snapping-rollers. Fig. 6 is a transverse section of the snapping-rollers. Fig. 7 is a sectional view of the coupling between the front wheels and the frame of the machine. Fig. 8 is a detail view showing the construction of the front end of the frame. Fig. 9 is an elevation of the inner side of a portion of one of the gatherers.

A indicates the main frame of the machine, which is supported on wheels B B, and this frame supports all the operative devices of the machine. It may be made of angle-iron or wood, as preferred, and must be of sufficient strength and rigidity to properly support the operating parts. Another frame, formed, preferably, of a metal bar C, bent to substantially V shape, is arranged in advance of the main frame, the ends of the two arms of this frame being respectively hinged at *c* to bars *d*, projecting forward from the main frame. In Fig. 1 only one of the bars *d* is seen, the other being hidden by the elevator-belt. The forward end of the frame C is curved and slotted horizontally, as indicated at 1, and just above the slot is a series of holes 2. A plate 3 is secured to the frame, and on this plate a lever 4 is pivoted, said lever projecting forwardly through slot 1 and being provided with upwardly-projecting lugs 5, one on each side of the bar C. The curvature of the front end of the frame C is the arc of a circle struck from the pivot of the lever 4. The forward end of the lever is pivotally connected to a bolt 6 in a bolster or frame E, mounted on an axle *e*, which carries the front wheels F. A bar 7 is loosely connected at its front end to the bolt 6 and at its rear end to the pivot-pin of the lever beneath the plate 3. The lever 4 extends rearwardly to be within convenient reach of the occupant of a seat 8, which is supported on the frame C. The lever is provided with a latch-bar 9, which extends through a guide-lug 10, the lugs 5, and either one of the series of holes. By this construction the operator is enabled to adjust the front wheels F laterally with respect to the gathering mechanism, and thus adapt the machine for different widths of rows of corn, so that when the horses, which are attached to the frame or bolster E, are properly driven on one row the gathering mechanism will be directly in place on the row being gathered.

G and H represent the gatherers, substantially triangular in form and the upper edges of which incline upwardly and rearwardly. These gatherers may be of wood or sheet-iron and are supported in any suitable manner on the main frame to bring their lower rear corners nearer to each other than are their lower front corners, so that the space between them gradually contracts toward the rear. Flanges *g* and *h* are secured to the upper edges of the respective gatherers, or they may be integral with them. Each of the gatherers G and H is slotted at *x* near its upper edge in order to permit the fingers 12 to project into the space between the said gatherers. These fingers are carried by a conveyer, consisting of sprocket-chains 13, which run over sprocket-wheels 14, journaled in suitable bearings on the gatherers or their supports. The flanges *g* and *h* protect the chains and wheels and prevent the corn from becoming entangled in them.

Substantially parallel to the slots *x*, through which the fingers 12 project, are projections 15, extending inwardly toward each other on the inner faces of the gatherers G and H, and, as shown in Fig. 1, these projections diverge from each other rearwardly. The gatherers are also slotted at *y* to permit the fingers 16 to extend into the space between them, said fingers being carried by sprocket-chains 17, which run over sprocket-wheels 18, and the chains 17 may be driven by the chains 13, as indicated in Fig. 2. The construction is designed to be such that at the lower and forward ends of the projections 15 the opposing fingers 16 of the chains or conveyers will almost touch each other, and as the chains or conveyers at this point are very near to the ground they will pick up any stalks which may be lying down, no matter which way they may be lying.

The gatherers G and H are supported at their lower edges on bars 19 and 19ª, which are rigidly connected to the main frame and to a frame L, to be hereinafter referred to. The forward ends of the flanges *g* and *h* and the bars 19 and 19ª form points *i*, which are turned up slightly to form noses or shoes to prevent the gatherers running into the ground in case they should contact with it. Preferably the bars 19 and 19ª will be of angle-iron, as indicated in Fig. 2; but they may be flat bars and preferably of substantially the same width as the flanges *g* and *h*. If of angle-iron, the horizontal legs will be preferably of substantially the same width as the said flanges.

Projections 20 extend forwardly from the lower ends of the projections 15 and gradually decrease in width until they merge into the gatherers at their noses *i*, their edges converging from the front of the gatherers toward the rear and being approximately horizontal and as close to the ground as possible, so that any stalk, even if bent forward onto the ground, is guided to the fingers 16, which will then lift and straighten the body of the stalk until it is caught by the fingers 12, which aid to elevate and guide it into the space between the rolls. The fingers 12 also aid to carry back to the rolls the stalks that stand upright.

At the rear of the gatherers G and H are the snapping-rollers J and K. These are journaled at their upper and lower ends in bearings carried by suitable framework, (indicated generally by L,) which needs no detailed description, it being sufficient to say that it is carried by the main frame A and is of suitable shape, strength, and material. The rollers J and K are inclined somewhat from the vertical, their lower ends being nearest to the front of the machine. The roller J is corrugated longitudinally, and the roller K is spirally grooved. The pitch of the spiral grooves *k* in the roller K is such that when the roller is inclined as shown and rotated the engaging portions of the spirals will be approximately vertical and parallel with the stalk while the latter is working through between the rollers. The grooves *k* are also of sufficient depth to receive the stalks without crushing them. By this construction the lower parts of the stalks first enter the grooves *k*; but the stalks remain standing without breaking, as the area of the engagement with the roll moves progressively upward as the machine moves forward until the stalk passes entirely from between the rollers in a standing position, while the opposite roll serves to hold the stalks in the grooves without crushing them and to act with the other roll to snap off the ears. In cross-section the grooves *k* have one side 21 at substantially a right angle to the periphery of the roller, while the remaining portion of the groove is oblique thereto. It is the side 21 which pushes against the stalk as it passes through between the rollers. The corrugations *j* in the roller J are also formed with one side 22 at substantially a right angle to the periphery of the roller, while the other side 23 is oblique thereto. When the stalk is passing through between the rollers, the edges of the sides 21 and 22 of the respective rollers K and J will coöperate to pinch off the ears from the stalk, and as the grooves *k* are deep the two rollers can work very close together without crushing the stalk. Furthermore, the stalk will offer very little resistance to the rotation of the rollers in passing between them, this being due to the depth and particular form and arrangement of the grooves *k* and to the feeding action of the projections of the roll J. It will require less power to operate the machine effectively than is required in most machines of the same class and capacity.

In order that the stalks may freely enter between the rollers J and K at their lower ends, each is tapered and spirally grooved, as indicated by 23ª and 24, respectively. In the case of the roller J the spiral grooves 23ª are on the tapered lower portion only, while on K the grooves 24 are continuations of the grooves *k*.

From the passage-way between the gatherers G and H an elevating-belt Y extends in an inclined plane transversely across the machine. The lower roller *y*, over which said belt runs, is just in advance of the snapping-rollers J and K and near their lower ends. The plate H extends only to the forward edge of the belt Y, and from the rear edge of said plate H a guard-plate 25 extends to the front side of the frame 26, which supports the belt Y, the function of this plate 25 being to prevent the ears of corn falling outside of plate H. Another guard-plate 27 extends upwardly from the rear side of the frame 26 and prevents the ears of corn from falling outside of the elevator-belt Y at that point.

In order to arrest the ears of corn at the foot of the elevator-belt Y, I have provided a gate made up of a plurality of plate-sections *m*. Each section is mounted on a bar 28, and all the bars are pivotally mounted on a stud or pin 29, supported in any suitable manner on the gatherer H, just in advance of the guard-plate 25, and each has a spring 30, which springs normally tend to force the sections *m* toward the inner face of the plate G. The forward corner of each section is cut away, as shown at 31, to present an inclined face to the incoming stalk, and as the machine moves forward the stalk will engage these inclined faces and force the sections *m* successively to one side; but only one section will be displaced at the same time. On the inner face of the gatherer G is a shelf or projection 32, which overhangs and inclines downwardly toward the opposing edges of the sections *m*, and the sections also incline downwardly toward the elevator-belt Y, so that the ears as they are pinched off by the rollers J and K will fall down on the shelf 32 and the sections *m* and normally tend to roll onto the elevator-belt.

It will be observed that the flange *h* is shorter than the flange *g*, and in order to positively guide the stalks up to the rollers J and K, I provide a rod N, which extends from the plate *h* into close proximity to said rollers.

The roller K is provided at its upper end with a shaft *o*, upon the upper end of which a fly-wheel O is mounted. The function of this fly-wheel is to insure uniform rotation of the roller K when a very large hill of corn or more than one stalk may be passing between the rollers.

The elevator-belt Y will deliver the ears of corn into a trough P, in the bottom of which a pair of husking-rollers *p* is mounted, these husking-rollers being of any suitable construction capable of removing the husks from the ears. The trough P inclines downwardly from the elevator-belt toward the rear of the machine, and the ears will pass from it into another trough Q, extending at a right angle to the trough P and in the bottom of which a carrier-chain *q* is supported, said chain being provided with pins *r*, which will engage the ears of corn and move them along the trough Q, from whence they may be discharged into any suitable receptacle.

It is necessary when the machine is in operation that some means be provided to raise and lower the front ends of the gatherers G and H to suit the condition of the corn. Various mechanisms may be devised for this purpose; but I prefer to provide a bar S, which is rigidly attached to the main frame of the machine and extends beyond it to a point about midway the length of one side of the frame C. A segmental rack *s* is rigidly attached to the forward end of this bar, and to it is pivoted a lever T, provided with a latch-bar *t*, adapted to engage with the teeth of the segmental rack and lock the lever in any desired position. The lever T is provided with an arm *u*, to which one end of the link *v* is loosely connected, the other end of said link being loosely connected to the side of the frame C. When the lever T is in the position shown in Fig. 2, the forward ends of the gatherers G and H will rest upon the ground; but when said lever is pulled over toward the seat 8 the frame A will rock upon the main axle, and thereby elevate the front ends of the gatherers G and H.

Upon the main axle *a* a sprocket-wheel 35 is rigidly mounted, or if the wheels B turn independently of the axle then said sprocket-wheel 35 will be rigidly attached to the wheel B adjacent to the gathering mechanism. This sprocket-wheel 35 transmits movement to another sprocket-wheel 36, which in turn transmits motion to a shaft 37, journaled in the frame L, above the rollers J and K. A bevel-gear 38 is secured to the shaft 37 and meshes with a bevel-gear 39 on the upper end of one of the rollers. The rollers K and J are geared together, as indicated at 40, so that when the machine is moving forward motion will be transmitted from the wheel B to said rollers and they will move in opposite directions. A shaft 41 is geared to one of the rollers and is provided with a bevel-gear 42, which meshes with a similar gear 43, the latter being rigidly connected to the sprocket-wheel 14 at the upper end of the gatherer G, and motion is thus imparted to the chain 13. The shaft 44, upon which the sprocket-wheel 36 is mounted, carries a bevel-gear 45, which meshes with a similar wheel 46, which is rigidly connected to a sprocket-wheel 47. A sprocket-chain 48 runs over the wheel 47 and another wheel 49, connected to the roller at the upper end of the elevator-belt Y, and motion is thus transmitted to the elevator-belt Y. On the opposite end of said upper roller is a gear 50, which transmits motion to a gear 51 on one of the husking-rolls *p*, said rolls being geared together to turn in opposite directions. A shaft 52 extends from the positively-driven roller *p* and carries a sprocket-wheel 53, over which a chain runs to a sprocket-wheel 54 and which transmits movement to the carrier-chain *q*, which works in the trough Q. On the other end of the shaft 44 is a bevel-gear which meshes with a similar gear which is fastened to the sprocket which is at the top of the gatherer H, and motion is thus imparted to the chains on this side of the gatherers.

From the foregoing description the operation of the machine will be readily understood, and it is therefore unnecessary to describe it in detail.

It is evident that some features of my invention may be used separately or in connection with others or with other equivalent features and that the details of construction and arrangement may be varied without departing from the spirit of my invention.

Having described the invention, I claim—

1. In a corn-harvester, the combination with the snapping-rollers, of spaced gatherers supported in advance of the rollers and converging rearwardly toward each other, each gatherer being substantially triangular in shape and having a nose or shoe at the junction of its upper and lower edges, and each gatherer being slotted near its upper edge and provided with a slotted projection 15 on its inner face substantially parallel with the slot, and fingers projecting through said slots and slotted projections and carried by chains movably supported on the gatherers, substantially as set forth.

2. In a corn-harvester, the combination with the snapping-rollers, of spaced gatherers supported in advance of the rollers, each gatherer having a projection 15 on its inner face, said projections diverging toward their rear ends and each being slotted, fingers mounted on movable chains projecting through said slots into the space between the gatherers, and projections 20 extending from the lower ends of the projections 15 to the front ends of the gatherers and diverging toward their forward ends, substantially as set forth.

3. In a corn-harvester, the combination with the snapping-rollers, of spaced gatherers supported in advance of the rollers, each gatherer being slotted near its upper edge and provided with a projection 15 on its inner face, substantially parallel with the slot, said projections being also slotted, and chains supported to travel over wheels mounted on the outer faces of said gatherers, each chain carrying a series of fingers which project through the respective slots into the space between the gatherers, substantially as set forth.

4. In a corn-harvester, a pair of snapping-rollers inclining rearwardly at their upper ends, one of said rollers being corrugated longitudinally and the other spirally grooved, the pitch of said grooves being such that when the roller is in its inclined position and operating upon a stalk of corn the engaging portion of the groove will be approximately vertical, substantially as set forth.

5. In a corn-harvester, the combination with the gatherers and the snapping-rollers, of an elevator-belt leading from the lower portion of the space between said gatherers immediately in advance of the snapping-rollers, a gate comprising a plurality of independently-movable sections arranged one in advance of the other and extending across the space between the foot of the elevator-belt and the outer gatherer, each section having an inclined front face, and each being provided with a bar 28, a stud or pin on which all the bars are pivoted, and independent springs engaging the respective bars to normally force the sections toward the outer gatherer, substantially as set forth.

6. In a corn-harvester, the combination with the gatherers and the snapping-rollers, of an elevator-belt leading from the inner side of the space between the gatherers, a gate comprising a plurality of independently-pivoted, spring-actuated sections extending across the space between the foot of the belt and the outer gatherer and inclining downwardly toward said belt, the pivots of said sections being on the same side of the space as the belt, and an overhanging inclined shelf secured to the inner face of the gatherer opposing the belt, substantially as set forth.

7. In a corn-harvester, the combination with the main frame and its supporting-wheels and the gathering devices supported by said main frame, of a front frame hinged to the main frame, a lever pivoted to the front end of said frame and projecting beyond it, a pair of supporting-wheels, a bolster or frame carried by said wheels and connected to the forward end of said lever whereby when said lever is turned upon its pivot the front wheels may be moved laterally toward or away from the gathering devices, and means to lock said lever in its adjusted position, substantially as set forth.

8. In a corn-harvester, a pair of spaced gatherers, each gatherer being slotted near its upper edge and provided with a projection 15 on its inner face substantially parallel with the slot, said projections being also slotted, and fingers projecting through said slots and carried by chains movably supported on the gatherers, substantially as set forth.

9. In a corn-harvester, a pair of snapping-rolls inclined upwardly and rearwardly, one with projections and the other spirally grooved, the pitch of the grooves being such that when the roller is in its inclined position and operating on a stalk of corn the engaging portion of the groove will be approximately vertical, combined with conveyers for carrying the stalks to the rollers, substantially as set forth.

10. In a corn-harvester, a pair of snapping-rolls inclined upwardly and rearwardly, one of said rolls being spirally grooved, the pitch of the grooves being such that when the roller is in its inclined position and operating on a stalk of corn the engaging portion of the groove will be approximately vertical, and the other roller arranged to hold the stalks in the said grooves and to act with snapping effect on the ears, substantially as set forth.

11. In a corn-harvester, a pair of snapping-rolls inclined upwardly and rearwardly, one with projections and the other spirally grooved, the pitch of the grooves being such that when the roller is in its inclined position and operating on a stalk of corn the engaging portion of the groove will be approximately vertical, and the other roll arranged to hold the stalks in the said grooves and to act with snapping effect on the ears, substantially as set forth.

12. In a corn-harvester, a harvesting apparatus, two inclined gatherers in advance of the harvesting apparatus and having at their lower forward ends two approximately horizontal portions in close proximity to the ground and converging toward the rear, and traveling conveyers adapted to engage the stalks, part of the engaging portions of said conveyers being located near the ground adjacent to the narrowest part of the passage between said horizontal portions of the gatherers and moving upward and rearward therefrom, whereby bent-over or fallen stalks will be engaged and raised by said conveyers, substantially as described.

In testimony whereof I have signed my name to this specification in the presence of two subscribing witnesses.

DANIEL ELMER ANTHONY.

Witnesses:

EMERY E. MELLEN,

CHRISTINA MELLEN.